United States Patent
Abe et al.

(10) Patent No.: US 7,630,168 B2
(45) Date of Patent: Dec. 8, 2009

(54) SOLUTION FOR LEAKING PROBLEM OF PUNCHING BASE AND COVER WITH SEAL TAPE

(75) Inventors: Kanako Abe, Kanagawa (JP); Takaaki Deguchi, Kanagawa (JP); Kohichi Suzuki, Kanagawa (JP); Shingo Tsuda, Kanagawa (JP)

(73) Assignee: Hitachi Global Storage Technologies Nethlerlnads B.V., Amsterdam (NL)

( * ) Notice: Subject to any disclaimer, the term of this patent is extended or adjusted under 35 U.S.C. 154(b) by 352 days.

(21) Appl. No.: 11/201,411

(22) Filed: Aug. 9, 2005

(65) Prior Publication Data
US 2006/0034010 A1   Feb. 16, 2006

(30) Foreign Application Priority Data
Aug. 9, 2004   (JP)   ............. 2004-231836

(51) Int. Cl.
*G11B 33/14*   (2006.01)
(52) U.S. Cl. ................................... 360/97.02
(58) Field of Classification Search .............. None
See application file for complete search history.

(56) References Cited

U.S. PATENT DOCUMENTS

| | | | | |
|---|---|---|---|---|
| 5,124,856 A | * | 6/1992 | Brown et al. | 360/97.03 |
| 5,138,506 A | * | 8/1992 | Beck et al. | 360/97.03 |
| 5,276,577 A | * | 1/1994 | Brooks et al. | 360/97.02 |
| 5,636,091 A | * | 6/1997 | Asano | 360/264.3 |
| 5,696,648 A | * | 12/1997 | Jeong et al. | 360/97.02 |
| 6,266,207 B1 | | 7/2001 | Iwahara | |
| 6,721,128 B1 | | 4/2004 | Koizumi et al. | |

FOREIGN PATENT DOCUMENTS

JP   05-074121   3/1993

\* cited by examiner

*Primary Examiner*—David D Davis
(74) *Attorney, Agent, or Firm*—Townsend and Townsend and Crew LLP; John Henkhaus

(57) ABSTRACT

Embodiments of the invention provide a data storage device improved in sealability between a base and a cover when sealed together, as well as a method of manufacturing the data storage device, are to be provided. In one embodiment, a disk enclosure of a hard disk drive includes a base in which a disk is accommodated, a top cover which covers an intra-base space, and a sealing tape for sealing a peripheral edge portion of the cover. The base is provided in an outer edge portion thereof with a covered portion which is covered with the sealing tape. In the covered portion, a sealed portion to which the sealing tape adheres is inclined so that an outer edge thereof becomes higher than an inner edge thereof.

9 Claims, 5 Drawing Sheets

Angle α = Atan(0.1/2.7)=2.121

SOLUTION FOR LEAKING PROBLEM OF PUNCHING BASE AND COVER WITH SEAL TAPE

CROSS-REFERENCES TO RELATED APPLICATIONS

This application claims priority from Japanese Patent Application No. JP2004-231836, filed Aug. 9, 2004, the entire disclosure of which is incorporated herein by reference.

BACKGROUND OF THE INVENTION

The present invention relates to a data storage device having a recording medium such as a disk and a method of manufacturing the same. More particularly, the present invention is concerned with a data storage device improved in interior sealability and a method of manufacturing the same.

Devices using various types of media such as optical disks and magnetic tapes are known as information recording and reproducing devices. Among them, hard disk drives (HDDs) have become popular as storage devices for computers to such an extent that they are one of the storage devices indispensable for today's computers. Further, not limited to computers, their application is widening more and more due to the superior characteristics with the advent of moving picture recording/reproducing devices, car navigation systems, removable memories for digital cameras and so on.

A magnetic disk used in HDD has plural concentric tracks. Address information (servo information) and user data are stored in each track. A magnetic head formed by a thin film element makes access to a desired area (address) in accordance with address information, whereby data can be written or read. In a data read processing, a signal read from the magnetic disk by the magnetic head is subjected to a predetermined signal processing such as waveform shaping or decoding in a signal processing circuit and is then transmitted to a host. Data transferred from the host is likewise subjected to a predetermined processing in the signal processing circuit and is then written to the magnetic disk.

The components concerned are housed within a hermetically sealed case composed of a base for carrying the components thereon and a cover for covering an opening of the case. The interior of HDD is maintained in a high degree of cleanness to ensure the reliability of head-disk interface. Further, environment temperature, humidity or moisture condensation exerts a great influence on the reliability of HDD, such as dust. Therefore, there is adopted a method, for example, wherein a packing is inserted into a base-cover boundary, then the base and the cover are lapped together through the packing and are united using screws.

For reducing the cost of HDD there also is known a method wherein a sheet metal base is used, a cover is put over the opening of the base like the dropping lid used in cooking, and an upper surface of the cover is covered with a sealing tape (this method will hereinafter be referred to as the sealing method) (see Patent Document 1, Japanese Patent Laid-Open No. Hei 10(1998)-334641).

For example, in a storage device described in Patent Document 1, a cover is formed so as to be fitted on an inner periphery surface of a base in such a manner that an upper end face of the cover is substantially flush with an upper end face of the base without projecting upward from the upper end face of the base. Therefore, the sealing tape becomes easier to be affixed to the sealed portion to improve workability.

BRIEF SUMMARY OF THE INVENTION

By deep drawing, however, it is difficult to make correction of parallelism of a sealing surface which is an edge portion of the base and there sometimes occurs a case where the sealing surface assumes not a horizontal state but a depending state while tilting downward, i.e., tilting in a direction in which an outer edge of the sealing surface is lower than an inner edge of the sealing surface. In this case, tension is applied constantly to the sealing tape in a peeling direction of the seal. Such an extremely strict condition causes leakage, for example, because the interior pressure of the case becomes high. Further, if the area which functions as the sealing surface diminishes largely in comparison with an actual design value due to a round portion formed in the plate thickness portion, there arises a serious leakage problem.

The present invention has been accomplished for solving the above-mentioned problems and it is a feature of the invention to provide a data storage device improved in sealability between a base and a cover when sealed together, as well as a method of manufacturing the data storage device.

In accordance with an aspect of the present invention, a data storage device comprises a medium for data storage; a base having an opening and receiving the medium therein; a cover for covering the opening of the base; and a sealing tape which covers at least a peripheral edge portion of the cover. The base has a covered portion covered with the sealing tape at an outer edge portion thereof positioned outside the opening, and a highest position of a sealed portion in the covered portion to which sealed portion the sealing tape adheres is not lower than the height of the peripheral edge portion of the cover.

Thus, the highest position of the sealed portion as a sealing tape adhering portion in the covered portion of the base covered with the sealing tape is not lower than the height of the peripheral edge portion of the cover, so that in the sealed portion it is possible to improve the sealability without the sealing tape being peeled by its rigidity. The highest position of the sealed portion is the highest position from an upper surface of the cover in the sealed portion.

It is preferable that, in the covered portion, an outer edge of the sealed portion to which the sealing tape adheres be higher than an inner edge thereof. Thus, in the covered portion of the base covered with the sealing tape, an outer edge of the sealed portion to which the sealing tape adheres is higher than an inner edge thereof, and therefore tension is applied in the sealing tape adhering direction in the sealed portion, whereby the adhesion of the sealing tape may be further improved.

Moreover, the sealed portion may have an inclination. By allowing the sealed portion to have an inclination such that its outer edge is higher than its inner edge, it is possible to improve the adhesion of the sealing portion.

In this case, for example, if the inclination of the sealed portion is set at an angle α of about 2.1 degrees or more, it is possible to ensure the improvement of adhesion in 3.5 type HDD or the like. For example, if the inclination is set at an angle α of about 1.2 degrees or more, it is possible to ensure the adhesion of 2.5 type.

It is preferable that the sealed portion higher in its outer edge than in its inner edge be present throughout the whole of the outer edge of the base. In this case, in the sealed portion, the adhesion may be improved even at a position difficult to undergo bonding due to a small area thereof for example.

It is preferable that the outer edge of the sealed portion be higher than the peripheral edge portion of the cover. In this case, the adhesion may be further improved.

The base may have a stepped portion on an outer periphery side of the opening and on an inner periphery side of the outer edge portion, and the cover may be fitted in the stepped portion. Like the so-called dropping lid used in cooking, the cover may be fitted in a position which covers the opening of the base.

Given that a relative angle between the cover and the base is α, an inclination of the cover from a horizontal plane is β, the width of the sealed portion is L, the thickness of an adhesive layer of the sealing tape is t, and an elongation rate of the sealing tape is s, $\cos(\alpha+\beta)$ is preferably larger than $1-ts/L \times (\pi/2-1)$. For example, the inclination may be set at an angle of $(\alpha+\beta)=24$ degrees or less. By setting the height of the outer edge at a value corresponding to the value, it is possible to improve the adhesion without imposing a burden on the sealing tape.

The sealing tape may be a single sealing tape which covers the whole surface of the cover. By merely affixing the sealing tape to the whole of the top cover, the inside of the base may be maintained in a hermetically sealed state. Therefore, an increase of the production cost caused by taking a measure for maintaining the sealability of the inside of the base may be avoided.

According to another aspect of the present invention, a method of manufacturing a data storage device comprises providing a cover and a base, the base having a receptacle portion for receiving therein a medium for data storage, the receptacle portion having on one surface side thereof an opening to be covered with the cover, the base further having a covered portion to be covered with a sealing tape at an outer edge portion positioned outside the opening, with a sealed portion being formed in the covered portion, the sealed portion being a surface to which the sealing tape adheres and having a highest position not lower than the height of a peripheral edge portion of the cover; accommodating the medium in the receptacle portion; covering the opening with the cover; and covering the covered portion and at least the peripheral edge portion of the cover with the sealing tape and adhering the sealing tape to the sealed portion.

By using a mold pre-designed to give an inclined or curved sealed portion of a base or by pressing the sealed portion so as to be inclined or curved, there is provided a base having a sealed portion as a surface to which the sealing tape adheres and which has a highest position not lower than the height of a peripheral edge portion of the cover. With such a base, it is possible to obtain a device case easy to be sealed and high in sealability and hence possible to fabricate a highly reliable storage device.

In this case, if there is provided a base having the sealed portion which is higher at an outer edge thereof than at an inner edge thereof, it is possible to obtain a device case easier to be sealed and higher in sealability.

It is also possible to provide a base having the sealed portion which has an inclination. In connection with the base, given that a relative angle between the cover and the base is α, an inclination of the cover from a horizontal plane is β, the width of the sealed portion is L, the thickness of an adhesive layer of the sealing tape is t, and an elongation rate of the sealing tape is s, it is preferable that $\cos(\alpha+\beta)$ be larger than $1-ts/L \times (\pi/2-1)$. For example, it is preferable for the base to be formed with the sealed portion which has an inclination of 24 degrees or less in terms of the angle $(\alpha+\beta)$.

According to another aspect of the present invention, a method of manufacturing a data storage device comprises designing a base, the base having a receptacle portion for receiving therein a medium for data storage, the receptacle portion having an opening on one surface side thereof, the base further having a covered portion to be covered with a sealing tape at an outer edge portion positioned outside the opening, with a sealed portion being formed in the covered portion, the sealed portion being a surface to which the sealing tape adheres and having a highest position not lower than the height of a peripheral edge portion of the cover; machining the base in accordance with the design; accommodating the medium in the receptacle portion of the base; covering the opening with a cover; and covering the covered portion and at least a peripheral edge portion of the cover with the sealing tape and adhering the sealing tape to the sealed portion.

Thus, there is designed a base formed with the sealed portion, the sealed portion being a surface to which the sealing tape adheres and having a highest position not lower than the height of the peripheral edge portion of the cover, and a data storage device is fabricated using the base which has been machined in accordance with the aforesaid design. As a result, it is possible to suppress the imposition of tension on the sealed portion in a sealing tape peeling direction and consequent likelihood of the peel. Consequently, it is possible to afford a storage device case high in sealability and fabricate a highly reliable data storage device.

It is preferable to design the base so that the sealed portion in the covered portion to which the sealing tape adheres has such an inclination as is higher at its outer edge than at its inner edge. By designing so that the outer edge has a higher inclination than the inner edge, the sealing tape becomes easier to be affixed to the sealed portion and it is possible to facilitate the manufacture of the data storage device.

In the case where the angle of the sealed portion has a normal distribution, it is preferable to design the base so as to have an inclination angle with a median value of not smaller than 3 σ in the normal distribution. By so doing, the sureness of inclination may be ensured even after machining of the sealed portion subsequent to the manufacture.

According to the present invention it is possible to provide a data storage device improved in sealability between a base and a cover when sealed together, as well as a method of manufacturing the data storage device.

DETAILED DESCRIPTION OF THE INVENTION

Figure 1:
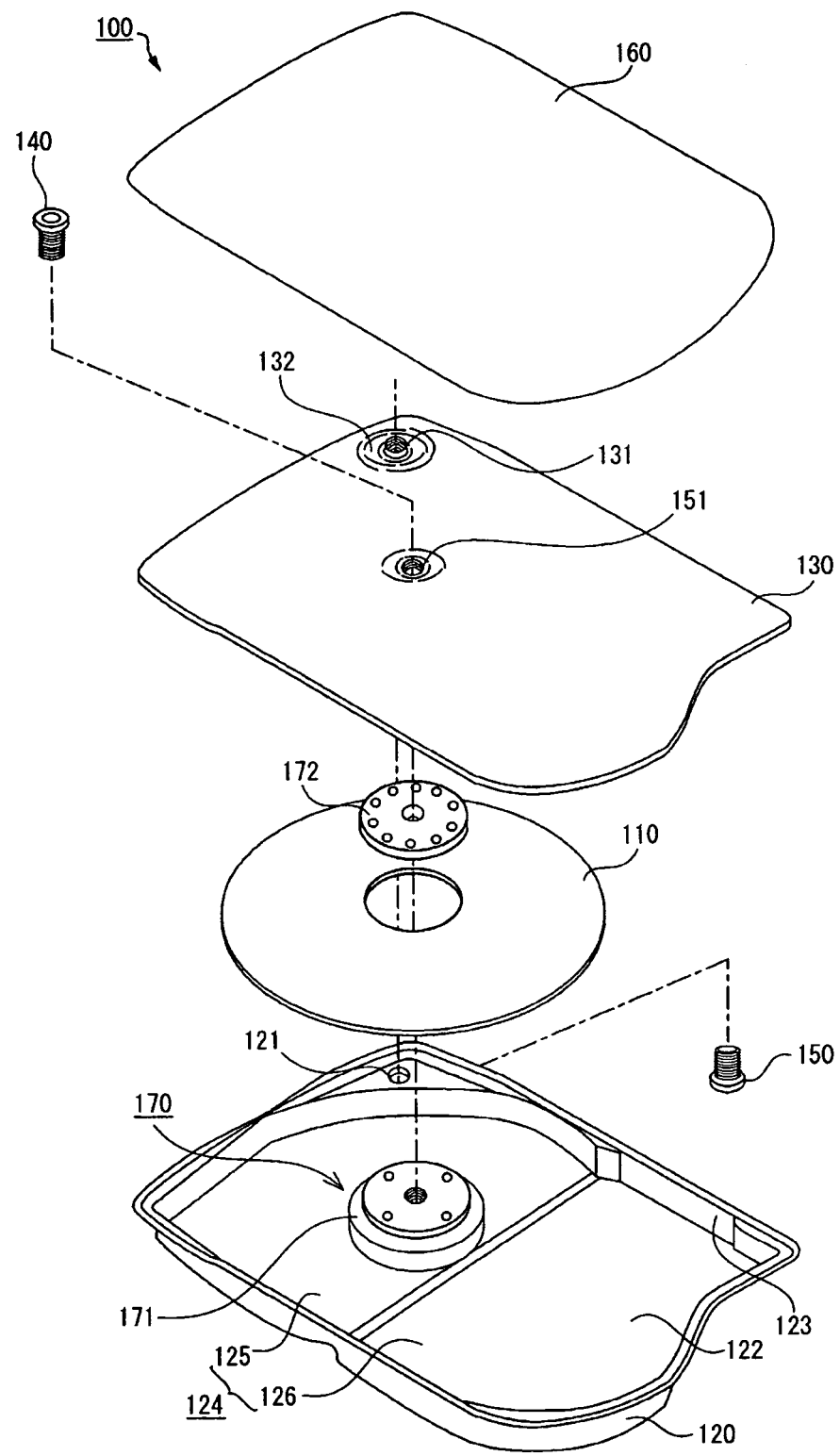
FIG. 1 is an exploded perspective view showing a construction example of a hard disk drive according to an embodiment of the present invention.

An embodiment of the present invention will be described hereinunder with reference to the drawings. First, a description will be given of the entire construction of a hard disk drive embodying the present invention. A partial construction of the hard disk drive is shown in FIG. 1. In the same figure there are shown principal components of the hard disk drive.

In FIG. 1, the hard disk drive is identified by the reference numeral 100. In the same figure, the numeral 110 denotes a magnetic disk, 120 denotes a base, 130 a top cover, 140, 150 screws, 160 a sealing tape, and 170 a spindle motor.

Various components of the hard disk drive 100 are fixed to a bottom 122 of the base 120. A wall 123 is formed so as to enclose an outer periphery of the bottom 122. An intra-base space 124 defined by the wall 123 is divided into plural areas. A disk assembly, including the magnetic disk 110 and a spindle motor to be described later, is accommodated in a disk accommodating area 125 as one of the plural areas. Further, an actuator to be described later is accommodated in an actuator accommodating area 126.

The top cover 130, which is a thin, substantially flat plate, is formed by pressing. In the top cover 130 is formed a tapping hole 131 which is a so-called burring tap. The burring tap 131 is formed nearly centrally of a depressed portion 132. The depressed portion 132 is generally circular in top view, but the shape thereof is not limited thereto. Various other shapes may be adopted. It is preferable that the depressed portion 132 be of a closed shape enclosing the depressed portion 132 when seen in top view.

The hard disk drive 100 of this embodiment has a structure like the dropping lid used in cooking. More specifically, the top cover 130 is fitted over an upper opening of the base 120 and closes the upper opening. As a result, the top cover 130 covers the disk assembly, including the magnetic disk 110, as well as a spindle motor and an actuator both to be described later. The top cover 130 is fixed to the base 120 through a gasket (not shown) formed of fluorine rubber, for example.

The screws 140 and 150 are tapping screws. The screw 140 fixes the top cover 130 to the base 120. The screw 150 not only fixes the top cover 130 to the base 120 but also fixes the spindle motor 170 in the intra-base space 124 of the base 120. Further, the screw 150 is fitted through a through hole 151 formed in the top cover 130 and is threadedly engaged with the spindle motor 170.

The sealing tape 160 is a sheet-like tape constructed of a synthetic resin, for example, and having a surface coated with an adhesive or a pressure-sensitive adhesive. The sealing tape 160 is affixed to the top cover 130 to close the gap between the base 120 and the top cover 130. In this case, a peripheral edge portion of the opening of the intra-base space 124 in the base 120, i.e., a part or the whole of an outer edge portion 127 (see FIG. 2) of the base 120, together with at least a peripheral edge of the top cover 130, constitutes a covered portion covered with the sealing tape 160. The covered portion indicates a portion of a flange which portion is covered with the sealing tape 160, the flange being formed in an outer edge portion of the base 120. As will be described later, the whole or a part of the covered portion constitutes a sealed portion to which the sealing tape 160 adheres. At least the sealed portion in the outer edge portion 127 is inclined in a rising direction to the center side of the top cover 130, i.e., inclined in such a manner that an outer edge of the sealed portion becomes higher than an inner edge thereof. Consequently, as will be described later, the adhesion of the top cover 130 and the base 120 to the sealing tape 160 may be improved.

In this way, a disk enclosure is constituted by the base 120 and the top cover 130, and various assemblies of the hard disk drive 100 are accommodated therein. For closing the gap between the base 120 and the top cover 130, it is preferable for the sealing tape 160 to have such a size as covers the upper opening of the base 120.

The sealing tape 160 may have such a shape as permits affixing of the tape to only portions where the air present inside the base 120 leaks. More specifically, the sealing tape 160 may be of such a shape as covers the outer periphery of the base 120 and the vicinity of the screw 140. In this case, the sealing tape 160 may be a single sheet or may be physically separated.

The spindle motor 170 is a motor for rotating the magnetic disk 110. More particularly, the spindle motor 170 may be a fluid bearing motor. In the case of a fluid bearing motor, only a fluid such as oil is present between a rotating part and a fixed part in a bearing portion of a rotary shaft of the motor, so that the rotating part may rotate smoothly. The spindle motor 170 may be a ball bearing motor.

The spindle motor 170 is disposed nearly centrally of the bottom 122 of the disk accommodating area 125 and is fixed to the bottom 122 of an inner surface of the base 120. A hub 171 is provided along an outer periphery of an upper surface of the spindle motor 170. The spindle motor 170 is connected to a circuit board (not shown). The circuit board (not shown) is attached to an outer surface (lower surface) of the base 120 and typically has a generally rectangular shape of such a size as covers an outer half surface of the base 120.

The magnetic disk 110 is placed on the hub 171 of the spindle motor 170 and a top clamp 172 is placed on the magnetic disk 110. Thus, the hub 171 holds the magnetic disk 110 grippingly between it and the top clamp 172. The top clamp 172 is fixed to the spindle motor 170 with the screw 150, whereby the magnetic disk 110 is fixed to the spindle motor 170 and is rotated at a predetermined rotational speed by the spindle motor.

Figure 2:
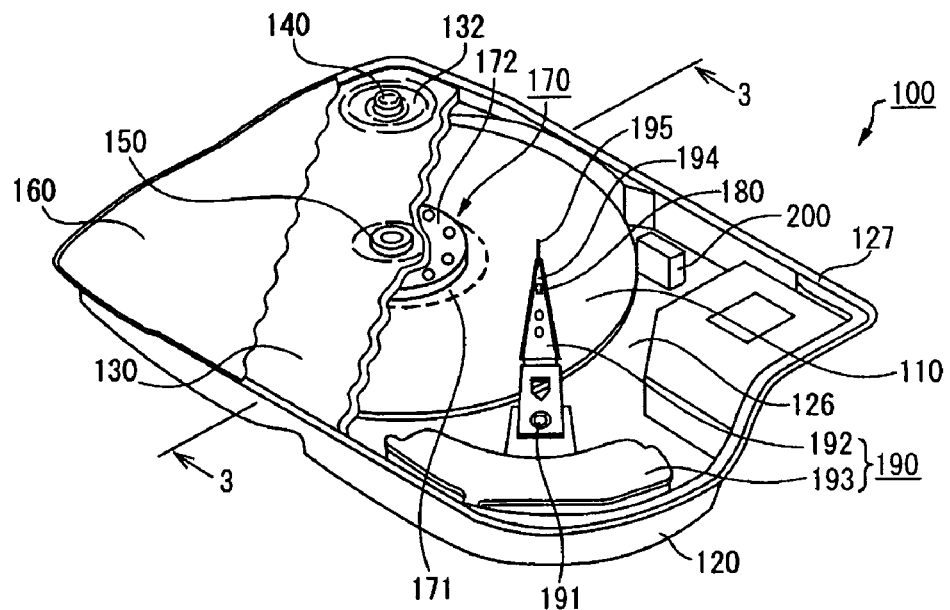
FIG. 2 is a perspective view showing a construction example of the hard disk drive.

A construction example of the hard disk drive 100 embodying the present invention is shown in a perspective view of FIG. 2. In the same figure, components of the hard disk drive 100 are in an accommodated state in the base 120.

In FIG. 2, the numeral 180 denotes a head, 190 an actuator, and 200 a ramp mechanism. With respect to data inputted and outputted between the head 180 and a host (not shown), the head 180 writes and/or reads the data to and/or from the magnetic disk 110. The head 180 has a write element and/or a read element and a slider (none of them is shown). The write element converts an electric signal into a magnetic field in accordance with data to be written to the magnetic disk 110. The read element converts a magnetic field provided from the magnetic disk 110 into an electric signal. The slider is formed on a surface(s) of the write element and/or the read element.

The actuator 190 supports the head 180 at one end thereof and is held pivotably by a pivot shaft 191 at an opposite end thereof. In this state, the actuator 190 may move the head 180 over the magnetic disk 110 or to a desired position away from the magnetic disk 110. Further, through an FPC (Flexible Printed Circuit) (not shown), the actuator 190 is connected to a circuit board (not shown) which is attached to the bottom of the base 120.

The actuator 190 includes an actuator arm 192 and a VCM (Voice Coil Motor) 193. A suspension 194 having elasticity is provided at a front end of the actuator arm 192. The head 180 is fixed to the suspension 194. Further, a tab 195 is formed at a front end of the suspension 194. The actuator arm 192 is pivotably secured to the pivot shaft 191 of the VCM 193. The actuator arm 192 and the VCM 193 are accommodated in the actuator accommodating area 126 of the base 120. The ramp mechanism 200 causes the head 180 to be retracted from the magnetic disk 110 when the disk stops rotation.

The hard disk drive 100 thus constructed operates in the following manner. When the hard disk drive 100 is OFF, the magnetic disk 110 is at standstill. In accordance with a drive signal flowing from a controller (not shown) to a flat coil, the VCM 193 moves the actuator arm 192 pivotally about the pivot shaft 191, whereby the head 180 may move over the magnetic disk 110 or move outside the magnetic disk.

The spindle motor 170 inputs and outputs motor driving electric power and signals between it and a circuit board (not shown). The actuator 190 inputs and outputs electric power to a coil for VCM 193 and electric power and signals for read in the head 180 between it and the circuit board (not shown). The input and output between the circuit board (not shown) and the actuator 190 are performed through an FPC (not shown).

For read/write of data from the magnetic disk 110, the actuator 190 moves the head 180 to a position above the data area on a surface of the magnetic disk 110 which is rotating. With pivotal motion of the actuator 190, the head 180 moves radially of the surface of the magnetic disk 110, whereby the head 180 may make access to a desired track.

When pressure induced by the viscosity of air present between an ABS (Air Bearing Surface) of the slider opposed to the magnetic disk 110 and the magnetic disk which is rotating balances with pressure which is applied toward the magnetic disk 110 by the actuator 190, the head 180 flies over the magnetic disk 110 through a certain gap.

The hard disk drive 100 of this embodiment is called a load/unload type. In more particular terms, when the rotation of the magnetic disk 110 stops, the head 180 comes into contact with the surface of the magnetic disk 110, causing an attracting phenomenon. Consequently, there arises a problem such as the data area being scratched or the magnetic disk becoming unable to rotate. To avoid the occurrence of such a problem, when the rotation of the magnetic disk 110 stops, the actuator 190 causes the head 180 to be retracted from the data area to the ramp mechanism 200.

When the actuator 190 turns toward the ramp mechanism 200, the tab 195 at a front end of the actuator 190 moves while sliding on a surface of the ramp mechanism 200. When the sliding tab 195 gets on a parking surface formed on the ramp mechanism 200, the head 180 is unloaded. The actuator 190 which has been supported by the parking surface in a loaded state of the head moves away from the ramp mechanism 200 up to a position over the surface of the magnetic disk 110. In a hard disk drive of CSS (Contact Start and Stop) type, the head 180 is retracted to a CSS zone formed on an inner periphery side of the magnetic disk 110.

Although the hard disk drive of this embodiment is provided with one magnetic disk 110, the present invention is also applicable to a hard disk drive provided with plural magnetic disks. To effect double-side recording for plural magnetic disks, the plural magnetic disks are held by the hub 171 integrally at predetermined intervals in the rotational axis direction of the spindle motor 170. Actuator arms each holding a recording surface scanning head are provided by the number corresponding to the number of recording surfaces and are fixed to the actuator 190 at positions superimposed on the actuator arm 192 at predetermined intervals.

The hard disk drive 100 of this embodiment may be incorporated in a computer system or may be used as a separate external storage device.

Figure 3:
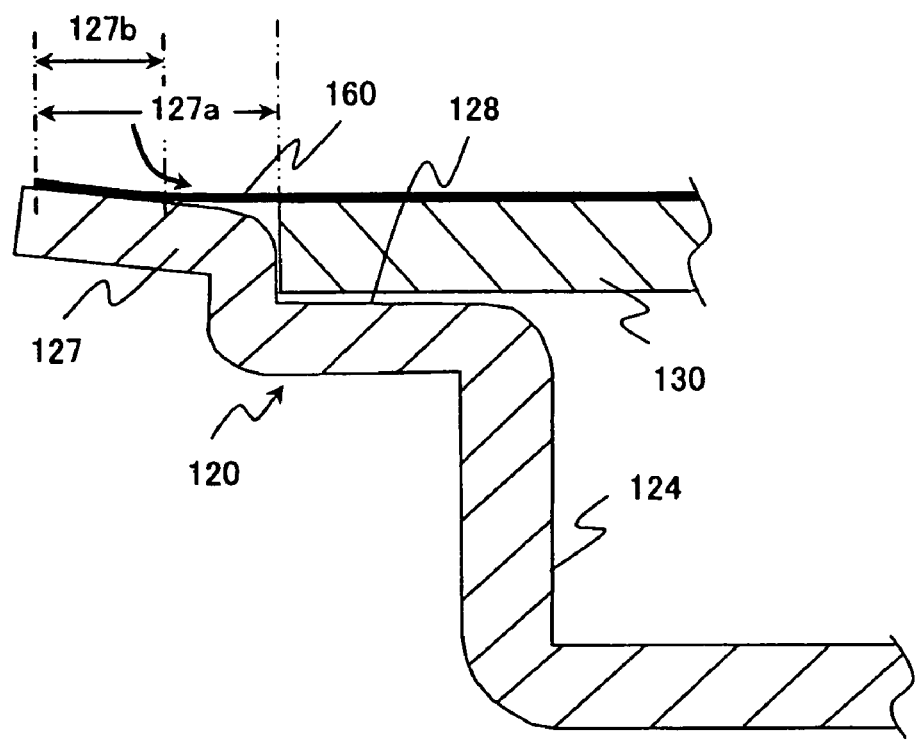
FIG. 3 is a partial sectional view taken on line 3A-3A of the hard disk drive shown in FIG. 2.
Figure 4:
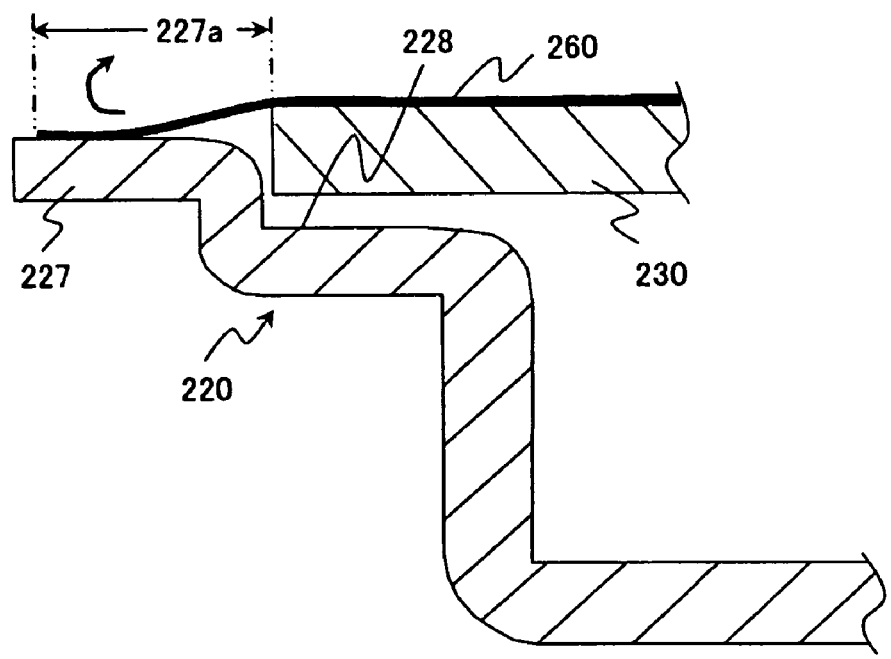
FIG. 4 is a partial sectional view of a conventional hard disk drive, showing a portion corresponding to FIG. 3.

The following description is now provided about the relation between the sealed portion 127b of the base 120 and the sealing tape 160 for the sealed portion of the hard disk drive 100 according to the present invention. FIG. 3 is a partial sectional view taken on line 3-3 of the hard disk drive 100 shown in FIG. 2. FIG. 4 is a partial sectional view showing a portion of a conventional hard disk drive which portion corresponds to FIG. 3.

As shown in FIG. 3, a stepped portion 128 is formed in an outer periphery of the intra-base space 124 of the base 120 and the top cover 130 is fitted in the stepped portion 128. Still outside the stepped portion 128 of the base 120 there is formed an outwardly projecting flange (hereinafter referred to as the "outer edge portion") 127. A part or the whole of the outer edge portion 127 serves as a covered portion 127a to be covered with the sealing tape 160. In this specification, as shown in FIG. 3, the covered portion 127a indicates an area from an inner side face of the stepped portion 128 up to a part or the whole of the outer edge portion 127 covered with the sealing tape 160. In the covered portion 127a, an adhered portion (adhered surface) to which the sealing tape 160 is adhered actually is here designated a sealed portion 127b. More specifically, in the covered portion 127a, when the outer edge portion 127 is formed by bending, for example, there exists a portion to which the sealing tape 160 does not adhere actually such as a curved surface formed in the bent portion. However, the sealed portion 127b as referred to herein indicates an area exclusive of the portion to which the sealing tape 160 does not adhere. An upper surface of the top cover 130 and the covered portion 127a are covered with the sealing tape 160. A disk enclosure is constituted when the top cover 130 and the sealed portion 127b are bonded with the sealing tape 160.

The covered portion 127a (or the outer edge portion 127) which is covered with the sealing tape 160 together with the top cover 130 is usually designed horizontally, but in this embodiment the covered portion 127a has an inclination such that an outer edge of the sealed portion 127b is higher than an inner edge thereof. As a result, even when the top cover 130 floats due to vibration or the like, the outermost edge of the sealing tape 160, i.e., the outer edge of the sealed portion 127b, becomes higher than the outer edge of the top cover 130, so that the tension of the sealing tape 160 acts, because of its rigidity, constantly in a direction in which the sealing tape is adhered more strongly to the sealed portion 127b, as shown in FIG. 3. Thus, the adhesion is improved and the problem of leakage may be avoided.

In this embodiment the sealed portion 127b has an inclination such that its outer edge is higher than its inner edge. However, if there is adopted a construction wherein a highest position of the sealed portion 127b is higher than an outer edge of the top cover 130, the rigidity of the sealing tape 160 may be allowed to act in a direction in which the sealing tape is adhered more strongly to the sealed portion 127b, as indicated with an arrow in FIG. 3. For example, the covered portion 127a may be formed such that an outer edge thereof is higher than inner edge thereof. The outer edge of the covered portion 127a is an outer edge of the area covered with the sealing tape 160 and is the same as the outer edge of the sealed portion 127b. However, in the case where the area from the stepped portion 128 to the outer edge portion 127 is curved, the inner edge of the covered portion 127a is assumed to be a position in which an extension line of a side face of the stepped portion 128 and an extension line of the sealed portion 127b intersect each other.

Without inclining the covered portion 127a to make its outer edge higher than its inner edge, for example the covered portion 127a may be curved so that a concave portion is formed on its underside (the base bottom side). Also in this curved case, like the inclined case, tension is applied to the sealing tape 160 in a direction in which the tape adheres more strongly to the sealed portion 127b, whereby the adhesion may be improved. Insofar as the outer edge of the sealed portion 127b is higher than the inner edge thereof, the covered portion 127a need not be inclined or curved up to a lower side face of the outer edge portion 127 where the sealing tape 160 is not affixed.

Thus, the sealed portion 127b is inclined so that its outer edge is higher than its inner edge. In this connection, the inclination in which the outer edge of the sealed portion 127b is higher than the inner edge thereof is here designated a positive inclination, while the inclination in which the outer edge of the sealed portion 127b is lower than the inner edge thereof is here designated a negative inclination.

As noted above, with the positive inclination, it is possible to improve the adhesion of the sealing tape 160 and obtain a disk enclosure high in sealability. On the other hand, the base 120 when seen in top view is generally rectangular and its four corners are rounded, so that the larger the angle of inclination of the sealed portion 127b, the shorter the outer edge of the sealed portion in each rounded portion than the outer edge thereof in an inclination-free case, and there may occur a case where it is difficult to affix the sealing tape 160 without wrinkles to the sealed portion 127b of the base 120. Therefore, it is preferable that the degree of inclination be set appropriately taking the ease of affixing of the sealing tape 160 into account.

The upper surface of the top cover 130 is usually formed substantially horizontally, but there sometimes is a case where the top cover itself has an inclination for some reason in manufacture or by design. It is here assumed that a relative angle between the base 120 and the top cover 130 is α and that the angle of inclination of the top cover from a horizontal plane is β. That is, when the top cover 130 itself has the inclination angle β, the relative angle α between the base 120 and the top cover 130 may be ensured by inclining the covered portion 127a of the base 120 at an angle of (α+β) from a horizontal plane. The inclination angle (α+β) of the base 120 from a horizontal plane is designated an absolute angle.

The following description is now provided about the effect of the present invention as compared with a conventional construction not having inclination. As shown in FIG. 4, a covered portion 227a provided in an outer edge portion of a conventional base 220 is formed so as to be horizontal. However, in the event the base 220 should rise due to vibration or oscillation, or in the event an error should occur in the height of a stepped portion 228 during manufacture which stepped portion is for fitting therein of a top cover 230, or in the event the plate thickness of the top cover 230 should be larger than a designed thickness, there may occur a case where an upper surface of the top cover 230 becomes higher than the covered portion 227a. In this case, as shown with an arrow in FIG. 4, tension may be applied to a sealed portion with a sealing tape 260 adhered thereto in the covered portion 227a in a direction in which the sealing tape 260 peels off, with consequent leakage of air therefrom.

On the other hand, in the embodiment of the present invention shown in FIG. 3, as described above, the sealed portion 127b has the positive inclination, so even when tension occurs on the side opposite to FIG. 4 and the top cover 130 becomes higher than the inner edge of the sealed portion 127b of the base 120, it is possible to maintain the adhered state of the sealing tape 160. More particularly, the sealing tape 160 tends to become straight even when bent, so that if the outer edge of the sealed portion 127b of the base 120 is lower than the inner edge thereof, a force acts in the peeling direction of the sealing tape. In contrast therewith, if the outer edge of the sealed portion 127b is higher than the inner edge thereof, a force acts in the adhering direction of the sealing tape 160, so that the sealing tape becomes difficult to peel off and hence it is possible to suppress the occurrence of air leakage. If the outer edge of the covered portion 127a in the base 120 is higher than the top cover 130, the adhesion between the sealed portion 127b and the sealing tape 160 is further ensured.

Figure 5:
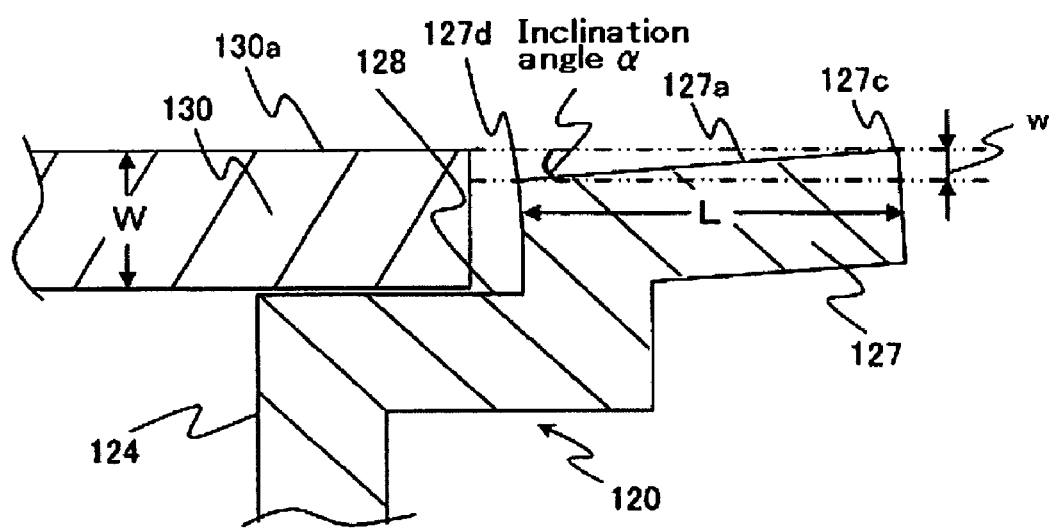
FIG. 5 is a diagram for explaining a relation in a fitted portion of a base and a top cover in the embodiment.

In the present invention, if the sealed portion 127b has the positive inclination, there is attained the effect that the adhesion of the sealing tape 160 is improved over the prior art. Reference will now be made to an example of a minimum value of the positive inclination. FIG. 5 is a diagram for explaining a relation between the base and the top cover in their fitted portion in this embodiment. In the same figure, for the simplification of explanation, the outer edge of the covered portion 127a (the outer edge of the sealed portion) is assumed to be the same as the outer edge of the outer edge portion 127 and the covered portion 127a and the sealed portion 127b are assumed to be coincident with each other. Further, reference will be made to an example in which a round portion is not formed by bending of the outer edge portion 127.

First, for attaining the effect of improving the adhesion by the positive inclination of the sealing surface, it is preferable that the height of an upper surface 130a of the top cover 130 be set at a value of not higher than an outer edge 127c of the sealed portion 127b. In FIG. 5, the outer edge 127c of the sealed portion 127b is an outer edge 127c of the covered portion 127a. As described above, this is because if the outer edge 127c of the sealed portion 127b is lower than the upper surface 130a of the top cover 130, there may occur a case where a force is applied to the sealing tape 160 in the peeling direction of the tape with consequent deterioration of the adhesion.

For enhancing the sureness of making the outer edge of the sealed portion 127b higher than the outer edge of the top cover 130, it is preferable to design or provide the base 120 having a positive, relative angle of not smaller than the following value. Given that a design value of the thickness of the top cover 130 is W, the magnitude of a deviation between an actual size of the thickness and the design value W is w and a minimum value ("minimum sealing width" hereinafter) of the covered portion 127a which may be ensured in the base 120 is L, the sureness of adhesion of the sealing tape 160 may be enhanced by setting the relative angle between the top cover 130 and the base 120 at a value of not smaller than the value of the following expression (1):

$$\alpha = \arctan(w/L) \quad (1)$$

In the above expression, the deviation magnitude w may be made an allowable range of deviation in the thickness direction, more particularly, a tolerance or the like. For example, it may be made a maximum value of error capable of being anticipated in manufacture. The minimum sealing width L represents a minimum value capable of being taken when it is desired to obtain the base 120 having a predetermined profile size and when a data storage medium of a predetermined size is accommodated in the base. Even when the top cover 130 itself has an inclination, it is possible to ensure the adhesion of the sealing tape 160 if the covered portion 127a or the sealed portion 127b of the base 120 has an inclination of the relative angle α which satisfies the above expression (1) relative to the top cover 130. Thus, by designing the base 120 so as to be inclined at an angle of not smaller than the relative angle α shown in the above expression (1) and by machining the base in accordance with the designed value, it is possible to let the base 120 have a positive inclination angle more surely even when the top cover 130 involves a tolerance.

Figure 6:
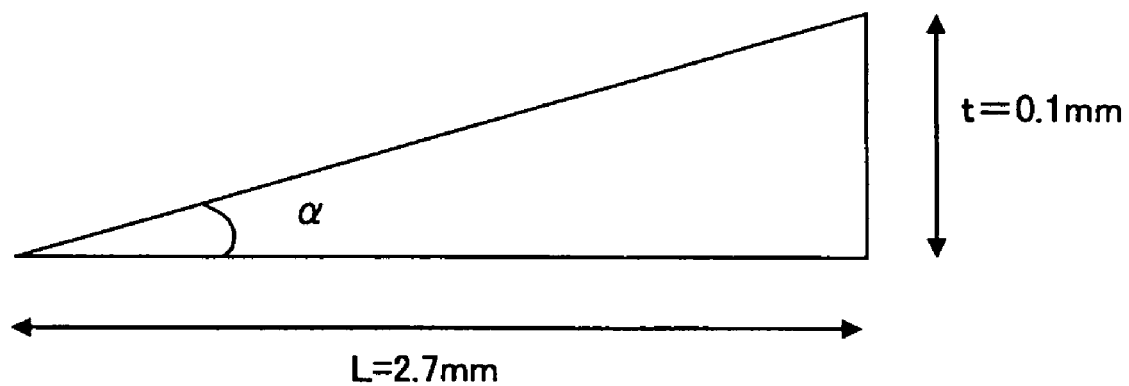
FIG. 6 is a diagram for explaining a minimum relative angle α in the embodiment.

In this connection, a concrete example will now be described. FIG. 6 illustrates the relative angle α. Generally, as the material of the top cover, a cold-rolled steel sheet (SUS 304) having a thickness of 1 mm is used from the standpoint of sound (acoustics), strength, and cost. As to SUS 304, an allowable range w of the thickness 1 mm is defined to be ±0.1 mm by JIS. That is, the thickness W of the top cover 130 made of 1 mm thick SUS 304 is in the range of 0.9 to 1 mm. As to HDD of 3.5 type (inch), a profile size thereof is defined to be 146 mm wide by 101.6 mm wide by the industry standard SFF (small form factor). The diameter of a 3.5 inch disk is 95 mm, and in the intra-base space 124, when the margin between the disk and the side face of the intra-base space 124 is assumed to be 0.6 mm, a maximum value capable of being taken at a position at which the sealing width L usually becomes narrowest is about 2.7 mm even if the width of the stepped portion 128 is assumed to be zero. Usually, in the base 120, it is near the peripheral edge of the area where the magnetic disk 110 is disposed that the minimum sealing width L is obtained.

By using the SUS 304 described above, even if the height of the stepped portion 128 on which the top cover 130 is placed and fitted is designed to be 1 mm and the base 120 is obtained with an ideal accuracy conforming to the design value, there is the possibility that the top cover 130 will become 0.1 mm at most higher than the inner edge 127*d* of the covered portion 127*a*. When these points are taken into account, in order to make the outer edge 127*c* higher than the top cover 130 at a position corresponding to the minimum sealing width L of 2.7 mm in the covered portion 127*a*, it is preferable that the inclination of the covered portion 127*a* be set at a positive, relative angle α of about 2.1 or more. As another example, in the case of 2.5 type, a top cover having a thickness of 0.2 mm is generally employed. An allowable range w of its thickness is 0.02 mm and hence α=1.193 degrees. By thus providing the base inclined to a greater extent that may ensure the height w at the position of the minimum sealing width L, the outer edge of the covered portion 127*a* may be made higher than the upper surface 130*a* of the top cover 130 throughout the whole circumference of the base 120, and thus the sealing tape 160 may be made difficult to peel off.

It is not necessary to take the above points into consideration in the case where an inclination having a large positive relative angle, e.g., a large relative angle of 5 degrees or more, may be formed. However, for example, when it is required to obtain a positive relative angle of smaller than 5 degrees, the base 120 is designed so as to give a value which satisfies the foregoing expression (1). More preferably, if a base which satisfies the foregoing expression (1) may be obtained, it is possible to enhance the sureness of the effect of improving the adhesion of the sealing tape 160 even when the base is assembled together with the top cover 130 which involves tolerance. As reasons why it is impossible to obtain an inclination of 5 degrees or more, there are mentioned limitations in point of space and manufacture and deflections of the sealing tape at the four corners of the base due to the type and characteristics of the sealing tape used which deflections would result in sealability being unable to be maintained.

The following method is mentioned as a method for ensuring a positive, relative angle. For example, the base 120 may be fabricated by pressing or die casting. Die casting is performed by pouring molten aluminum under a high pressure into a die and hence there sometimes occurs a case where the base is not always formed in conformity with a desired shape, depending on how molten aluminum flows and how cooling is done. Also in the pressing work there sometimes occurs a case where the shape after molding does not coincide with a desired shape.

In case of fabricating the base 120, as described above, even when the covered portion 127*a* or the sealed portion 127*b* is to be provided horizontally, there sometimes occurs a case where the covered portion or the sealed portion has a positive or negative relative angle partially and unintentionally. If there is a portion having a negative relative angle, leakage is apt to occur in this portion as noted earlier. Therefore, it is preferable for the base to have a positive relative angle throughout the whole circumference of the sealing surface, at least in the sealed portion 127*b*.

To let the sealed portion 127*b* surely have a positive inclination, and if the angle of sealed portion has a normal distribution, it is preferable to let the sealed portion have a relative angle with 3σ or more in the normal distribution as a median value in the stage of design, wherein σ is the standard deviation thereof. By so doing, the sealed portion 127*b* may be given a positive inclination more surely. For example, when σ is 0.6, 3σ=1.8 (°). In this case, at the time of machining the base 120, if the sealed portion 127*b* of the base 120 may be designed so as to be inclined 1.8° or more and the base is machined in accordance with this design value, it is possible to let the sealed portion 127*b* have a positive relative angle.

Thus, the adhesion of the sealing tape 160 is improved by letting the sealed portion 127*b* have a positive inclination, but if the sealed portion 127*b* is designed to have a relative angle α with 3σ or more as a median value and the base is machined in accordance with this design value, it is possible to let the sealed portion have a positive inclination extremely surely and thereby improve the adhesion of the sealing tape 160 and remedy the problem of leakage.

When the workability in the sealing work is taken into account, as noted above, a too large degree of a positive inclination is not preferred. A preferred positive inclination is such that, for example, two-thirds of the distance in the width direction from the inner to the outer edge of the sealed portion is at an angle of not higher than the end portion of the top cover, whereby it is possible to prevent a lowering of workability. Different conditions exist in the case where the workability is deteriorated depending on the material of the seal and the area of the sealing surface.

Figure 7:
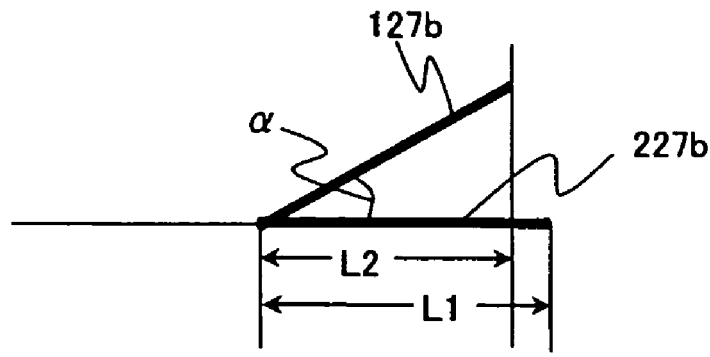
FIG. 7 is a diagram for explaining a maximum absolute angle $(\alpha+\beta)$ in the embodiment.
Figure 8:
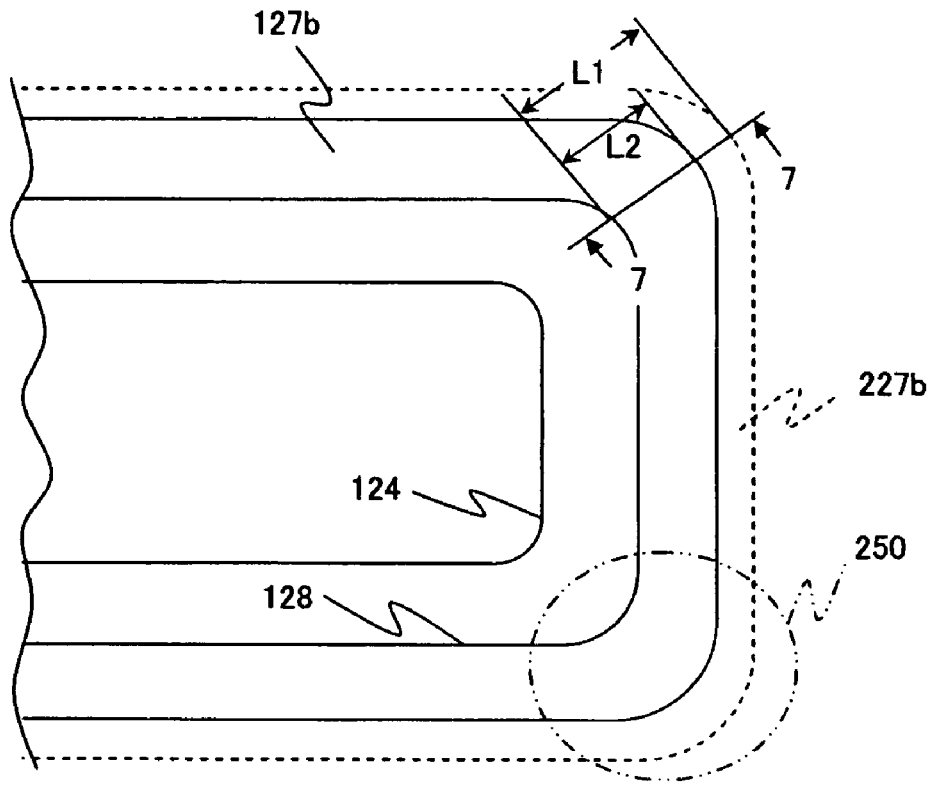
FIG. 8 is a plan view of the base as seen from an opening side for explaining the maximum absolute angle $(\alpha+\beta)$.

An inclination angle (absolute angle) (α+β) from a horizontal plane of the base 120 may be determined on the basis of properties of the sealing tape. FIGS. 7 and 8 are for explaining a maximum value of the absolute angle (α+β). FIG. 8 is a top view of the base 120 as seen from the opening side of the base 120. FIG. 7 is a sectional view taken on line 7-7 in FIG. 8, showing a schematic structure of the sealed portion. In both figures, for the purpose of simplification, the covered portion 127*a* and the sealed portion 127*b* to which the sealing tape 160 is adhered are assumed to be the same area and only the sealed portion 127*b* is shown.

When the sealed portion 127*b* of the base 120 tilts, at each of round (R) portions (e.g., the area enclosed with a dash-double dot line in FIG. 8) 250 of the four corners, the outer periphery of the sealing tape becomes shorter than in a sealed portion 227*b* in which the sealed portion 127*b* does not tilt. More particularly, at round portions 250 when the base is seen in top view and when the sealed portion 127*b* tilts, a horizontal distance L2 from the inner to the outer edge of the inclined sealed portion 127*b* is shorter than the width of the sealed portion 227*b* (the distance from the inner to the outer edge of the sealed portion 227b) L1, as L2=L1 cos α. Consequently, a circumferential length M1 of the outer edge of the inclined sealed portion 127b becomes shorter than a circumferential length M2 of the outer edge of the horizontal sealed portion 227b and it becomes necessary to so much shrink the sealing tape in the sealed portion 227b. In this case, the sealing tape may be buckled and wrinkled with consequent fear of leakage.

Figure 9:
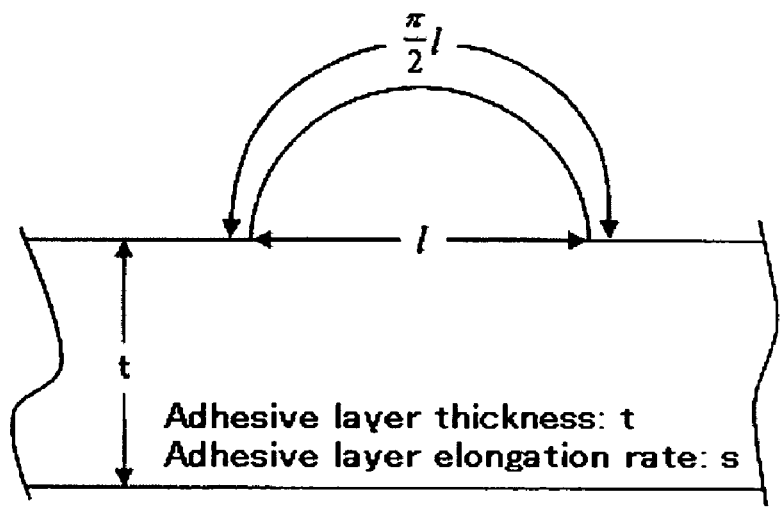
FIG. 9 is a schematic diagram showing a model of wrinkle of a sealing tape used in the embodiment.

Such wrinkles of the sealing tape are related to the thickness of the adhesive (adhesive layer) applied to the adhering surface of the sealing tape and an elongation rate of the tape. This relation will be explained below with reference to a simple wrinkle model as an example. FIG. 9 is a schematic diagram showing a wrinkle model. In the same figure there is shown only the portion of an adhesive layer of a wrinkled sealing tape. For simplification of the model it is assumed that when an adhesive layer having a thickness of t shrinks and is wrinkled, the adhesive layer is elongated in the wrinkled direction and a hemispherical convex portion is formed thereby.

As shown in this model, given that the diameter of the convex portion is l, a surface length at a diametric position of the convex portion is πl/2, the thickness of the adhesive layer is t, and an elongation rate of the sealing tape is s, a surface length at the diametrical position of the convex portion formed by wrinkles satisfies the following expression (2):

$$\frac{\pi}{2}l < t \cdot s \quad (2)$$

A maximum length at which the adhesive layer should shrink as a result of formation of the convex portion, i.e., the length of shrink at the diametrical position of the convex portion, becomes the following expression (3):

$$\frac{\pi}{2}l - l = \left(\frac{\pi - 2}{2}\right)l \quad (3)$$

On the other hand, given that the inside diameter of the covered portion 127a in each of the round portions 250 at the four corners of the base is r and the outside diameter thereof is r+L (L is the width of the covered portion 127a), an outside diameter in case of having the absolute angle (α+β) becomes r+L cos(α+β). Therefore, a shrink length of the sealing tape in one round portion is determined using the following expression (4):

$$(r+L)-(r+L\cos(\alpha+\beta))=(1-\cos(\alpha+\beta))L \quad (4)$$

From the above expressions (2) to (4), cos(α+β) is determined using the following expression (5):

$$\cos(\alpha + \beta) > 1 - \frac{t \cdot s}{L} \times \left(\frac{\pi - 2}{2}\right) \quad (5)$$

A concrete description is now provided for an example of actual use in product. In the 3.5 type hard disk drive, from the standpoint of workability and durability, it is necessary to ensure about 1 mm as the value of L of the sealed portion. The thickness t of the sealing tape used commonly is 100 µm (0.1 mm) and the elongation rate s thereof is about 1.5. In this case, from the expression (5), cos(α+β)>0.914, and α+β<23.88. The elongation rate s of the sealing tape indicates an elongation rate at which the adhesive layer (sealing tape) breaks. It is assumed that this breakage includes not only breakage of the sealing tape itself, but also cracking of a part of the adhesive layer and formation of an aperture in part of the adhesive layer. In this concrete example it is preferable that the absolute angle (α+β) be set at, say, 24° or less.

Thus, the larger the elongation rate and thickness of the sealing tape become, the larger the maximum absolute angle (α+β) determined as above. As far as the absolute angle (α+β) satisfies at least the expression (5) although the value thereof varies depending on the elongation rate of the sealing tape, the problem of leakage may be remedied while maintaining the workability and adhesion in the sealing work. The possibility of leakage may be further diminished if the sealing tape is not wrinkled, that is, if the sealing tape does not undergo buckling. For example, a maximum absolute angle (α+β) at which the sealing tape does not undergo buckling may be determined by experiment or by calculation from the area of the sealed portion and the thickness and rigidity of the sealing tape and an angle of not larger than the angle thus determined may be adopted.

In the conventional method using a gasket, it is necessary that a uniform and high pressure be applied using a large number of screws, while in this embodiment constructed as above, there is provided the sealed portion 127a which is inclined so that the covered portion 127b in the outer edge portion of the base 120 has a positive inclination angle at the time of sealing the base 120 and the top cover 130 with the sealing tape 160, whereby a high adhesion between the base 120 and the top cover 130 may be maintained without using the thrust of screw and hence it is possible to suppress the occurrence of leakage.

Moreover, with the disk enclosure using the sealing tape, the cost may be reduced in comparison with the case where the base and the top cover are screwed, and by tilting the sealed portion it is possible to make the sealing tape difficult to peel off. Consequently, in comparison with the prior art, the area to be ensured as the sealing surface may be diminished and hence it is possible to reduce the size of the hard disk drive.

It goes without saying that the present invention is not limited to the above embodiment, but that various changes may be made in the scope not departing from the gist of the present invention. For example, the sealing tape 160 may cover only the vicinity of the outer peripheral edge portion of the top cover 130 and the sealed portion 127b. As noted earlier and as shown in FIG. 3, it is not always necessary for the sealing tape 160 to reach the outermost edge of the outer edge portion 127. The outermost edge of the outer edge portion may be bent so as to reach the back side. In this case, the outer edge portion 127 may be formed so that the highest position on its upper surface side is higher than the vicinity of the outer peripheral edge portion of the top cover 130.

Further, although in the above embodiment the outer edge portion 127 serves as a flange portion projecting outward from the outer periphery of the opening, insofar as the highest position of the sealed portion 127b as the surface to which the sealing tape 160 is adhered actually, in the covered portion 127a covered with the sealing tape 160, is not lower than the height of at least the peripheral edge portion of the top cover 130, it is possible to ensure the adhesion of the sealing tape 160 when affixed from the top cover 130 to the sealed portion 127b of the base 120. That is, when the surface which constitutes the sealed portion 127b is upwardly chevron-shaped or convex-shaped, there is no problem insofar as the highest position thereof is not lower than the height of the peripheral edge portion of the top cover 130.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A data storage device comprising:
    a medium for data storage;
    a base having an opening and a receptacle portion for receiving the medium therein;
    a cover to cover the opening of the base; and
    a sealing tape which covers at least a peripheral edge portion of the cover;
    wherein the base has a covered portion covered with the sealing tape at an outer edge portion thereof positioned outside the opening, and a highest position of a sealed portion in the covered portion to which sealed portion the sealing tape adheres is not lower than the height of the peripheral edge portion of the cover,
    wherein an outer edge of the sealed portion in the covered portion to which sealed portion the sealing tape adheres is higher than an inner edge of the sealed portion, and
    wherein the sealed portion has an inclination.

2. A data storage device according to claim 1, wherein, given that a relative angle between the cover and the base is $\alpha$, an inclination of the cover from a horizontal plane is $\beta$, the width of the sealed portion is L, the thickness of an adhesive layer of the sealing tape is t, and an elongation rate of the sealing tape is s, $\cos(\alpha+\beta)$ is larger than $1-ts/L\times(\pi/2-1)$.

3. A data storage device according to claim 1, wherein, given that a relative angle between the cover and the base is $\alpha$, the sealed portion has an inclination of not smaller than about $\alpha=2.1$ degrees.

4. A data storage device according to claim 1, wherein, given that a relative angle between the cover and the base is $\alpha$, the sealed portion has an inclination of not smaller than about $\alpha=1.2$ degrees.

5. A data storage device according to claim 1, wherein, given that a relative angle between the cover and the base is $\alpha$, an inclination of the cover from a horizontal plane is $\beta$, the sealed portion has an inclination of not larger than about $(\alpha+\beta)=24$ degrees.

6. A data storage device according to claim 1, wherein the sealed portion higher at an outer edge thereof than at an inner edge thereof is present throughout the whole circumference of the outer edge portion of the base.

7. A data storage device according to claim 1, wherein an outer edge of the sealed portion is higher than the peripheral edge portion of the cover.

8. A data storage device according to claim 1, wherein the base has a stepped portion on an outer periphery side of the opening and on an inner periphery side of the outer edge portion, and the cover is fitted in the stepped portion.

9. A data storage device according to claim 1, wherein the sealing tape is a single sealing tape which covers the whole surface of the cover.

* * * * *